US012101243B2

(12) United States Patent
Gao et al.

(10) Patent No.: US 12,101,243 B2
(45) Date of Patent: Sep. 24, 2024

(54) LINK PATH CALCULATION METHOD, APPARATUS, TERMINAL AND COMPUTER-READABLE STORAGE MEDIUM (71) Applicant: XI'AN ZHONGXING NEW SOFTWARE CO., LTD., Xi'an (CN)

(72) Inventors: Chenqiang Gao, Shenzhen (CN); Jinghai Yu, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 279 days.

(21) Appl. No.: 17/635,912

(22) PCT Filed: Jul. 14, 2020

(86) PCT No.: PCT/CN2020/101952
§ 371 (c)(1),
(2) Date: Feb. 16, 2022

(87) PCT Pub. No.: WO2021/031744
PCT Pub. Date: Feb. 25, 2021

(65) Prior Publication Data
US 2022/0286380 A1    Sep. 8, 2022

(30) Foreign Application Priority Data
Aug. 20, 2019 (CN) .......................... 201910770799.5

(51) Int. Cl.
*H04L 45/121* (2022.01)
*H04L 45/02* (2022.01)
(52) U.S. Cl.
CPC ............ *H04L 45/121* (2013.01); *H04L 45/02* (2013.01)
(58) Field of Classification Search
None
See application file for complete search history.

(56) References Cited

U.S. PATENT DOCUMENTS

2019/0173779 A1   6/2019  Gruner et al.
2020/0304408 A1*  9/2020  Suthar ................... H04L 67/141
(Continued)

FOREIGN PATENT DOCUMENTS

WO     2018015425 A1    1/2018

OTHER PUBLICATIONS

5G-ACIA White Paper "Integration of 5G with Time-Sensitive Networking for Industrial Communications", Published by ZVEI—German Electrical and Electronic Manufacturers' Association 5G Alliance for Connected Industries and Automation (5G-ACIA) pp. 1-48 (Year: 2021).*

(Continued)

*Primary Examiner* — Lonnie V Sweet
(74) *Attorney, Agent, or Firm* — Vivacqua Crane, PLLC (57) ABSTRACT

A link path calculation method, device, terminal device and non-transitory computer-readable storage medium are disclosed. The method may include: acquiring a topology containing a TSN bridge, the TSN bridge comprising a 5GS TSN virtual bridge and a common TSN bridge; acquiring a latency parameter of a link of the TSN bridge; acquiring a minimum latency Tmin achievable by the 5GS-TSN-VB and a maximum latency MaxLatency in service requirements; calculating an optimal path and determining a sum Tc of all link latencies on the optimal path; determining a maximum latency Tmax tolerated by the 5GS-TSN-VB; determining an optimal value Tmax–O of the Tmax; and sending service flow information and the Tmax–O as latency requirements to a 5GS system corresponding to the 5GS-TSN-VB, and sending the service flow information to a corresponding TSN bridge in response to path calculation being successful.

18 Claims, 8 Drawing Sheets

(56) References Cited

U.S. PATENT DOCUMENTS

| | | | | |
|---|---|---|---|---|
| 2021/0204172 A1* | 7/2021 | Rost | ................. | H04W 28/0268 |
| 2021/0250787 A1* | 8/2021 | Kolding | ................ | H04L 47/283 |
| 2021/0306901 A1* | 9/2021 | Mannweiler | ............ | H04L 45/02 |
| 2022/0263743 A1* | 8/2022 | Gebert | ................... | H04L 45/24 |

OTHER PUBLICATIONS

3GPP Technical Specification Group and System Aspects. "Change Request for TSN-5GS QoS mapping," 3GPP TSG-SA WG2 Meeting, Mar. 2019, pp. 1-6.

3GPP Technical Specification Group and System Aspects. "Study on enhancement of 5G System (5GS) for vertical and Local Area Network (LAN) services (Release 16)," Jun. 2019, pp. 1-117.

3GPP Technical Specification Group and System Aspects. "Updates on Solution #18," 3GPP TSG-SA WG2 Meeting, Nov. 26-30, 2018, pp. 1-8.

European Patent Office. Extended European Search Report for EP Application No. 20854158.1, mailed Aug. 29, 2022, pp. 1-12.

International Searching Authority. International Search Report and Written Opinion for PCT Application No. PCT/CN2020/101952 and English translation, mailed Oct. 16, 2020, pp. 1-10.

3GPP Technical Specification Group Service and System Aspects. "Qos Negotiation between 3GPP and TSN networks KI#3.1," 3GPP SA WG2 Meeting #129, Oct. 15-19, 2018, pp. 1-9.

3GPP Technical Specification Group Service and System Aspects. "Change Request: TSN QoS and traffic scheduling in 5GS," 3GPP TSA-SA WG2 Meeting #130, Jan. 21-25, 2019, pp. 1-9.

3GPP Technical Specification Group Service and System Aspects. "5G bridge granularity," 3GPP TSA-SA WG2 Meeting #132, Apr. 8-2, 2019, pp. 1-6.

3GPP Technical Specification Group Service and System Aspects. "TSN-5GS QoS mapping," 3GPP TSA-SA WG2 Meeting #132, Apr. 8-12, 2019, pp. 1-7.

* cited by examiner

LINK PATH CALCULATION METHOD, APPARATUS, TERMINAL AND COMPUTER-READABLE STORAGE MEDIUM

CROSS-REFERENCE TO RELATED APPLICATION

This application is a national stage filing under 35 U.S.C. § 371 of international application number PCT/CN2020/101952, filed Jul. 14, 2020, which claims priority to Chinese patent application No. 201910770799.5 filed on Aug. 20, 2019. The contents of these applications are incorporated herein by reference in their entirety.

TECHNICAL FIELD

Embodiments of the present disclosure relate to, but are not limited to, the field of network communications and, in particular to, but are not limited to, a link path calculation method, device, and terminal device, and a non-transitory computer-readable storage medium.

BACKGROUND

The 3rd Generation Partnership Project (3GPP) has determined the Service-based architecture (SBA) as the 5G unified infrastructure. The official name of the 5G System Architecture Standards Project is: the 5G System Architecture, or 5GS for short.

When the 5GS is to support Time sensitive Network (TSN) requirements, the 5GS plans to emulate a TSN bridge to reduce the impact on other TSN entities (e.g. CNC, CUC, End-Station, etc.), while the 5GS is internally a black box to the outside and will not significantly alter the 5GS. The 5GS functions as a bridge for the TSN network and consists of ports on the User Plane Function (UPF) side, user plane tunnels between User Equipment (UE) and the UPF, ports on the UE/TT side, and interfaces between virtual bridges. For the TSN virtual bridge of the 5GS, the ports on the UPF/TT and UE/TT sides support the connection with the TSN network, and the UPF/TT and UE/TT are associated with each other by the PDU sessions inside the 5GS. The connection diagram is as shown in FIG. 1, where TT is TSN Translator and PDU is Protocol Data Unit.

Figure 1:
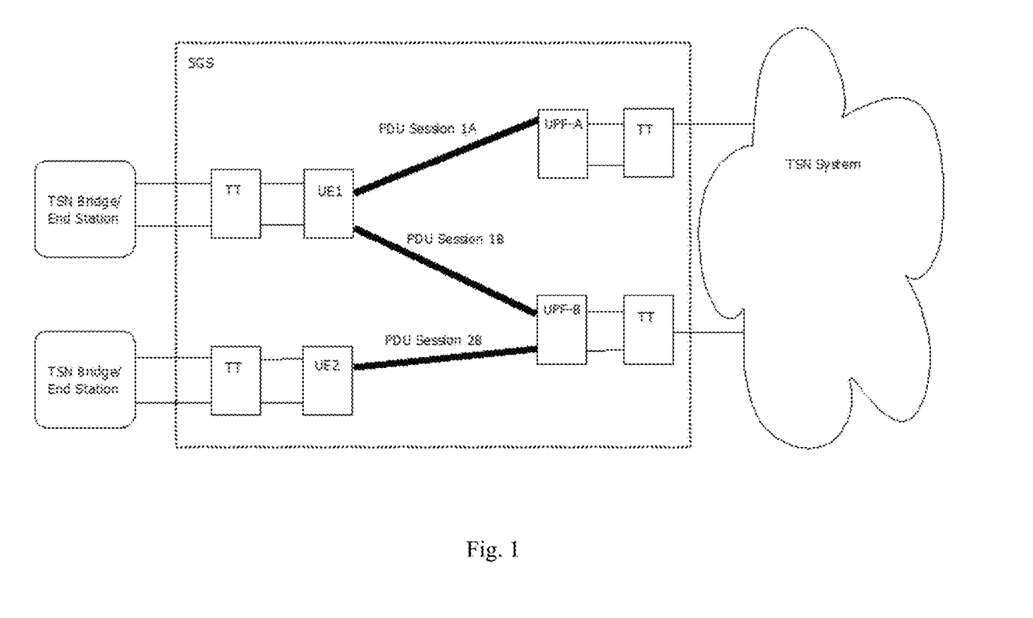
FIG. 1 is a schematic diagram of a 5GS virtual bridge provided in the background section of the present disclosure.
Figure 2:
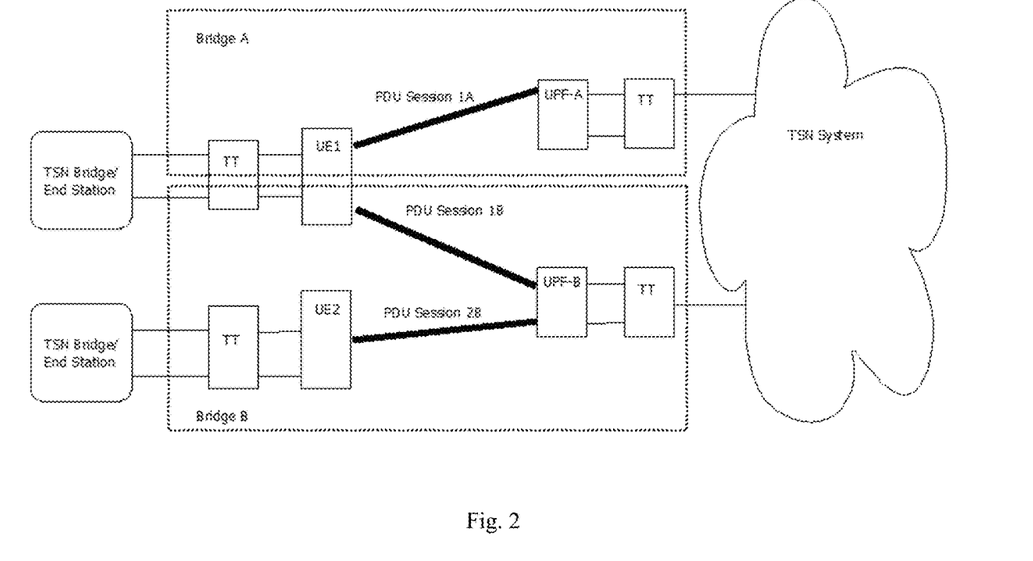
FIG. 2 is a schematic diagram of UPF-based segmentation of a 5GS virtual bridge provided in the background section of the present disclosure.
Figure 3:
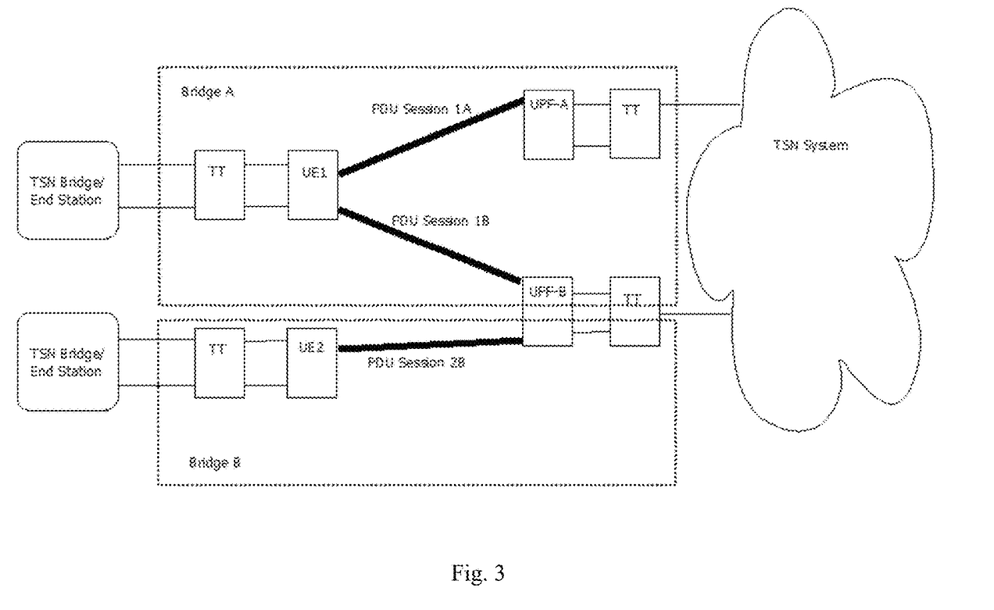
FIG. 3 is a schematic diagram of UE-based segmentation of a 5GS virtual bridge provided in the background section of the present disclosure.

For the convenience of management, the 5GS system may use multiple segmentation methods: in one of them, no segmentation is performed in the whole system and the whole system acts as a TSN virtual bridge, as shown in FIG. 1, while in the other, segmentation is performed based on each UPF, as shown in FIG. 2. Another method is to perform segmentation based on UE, as shown in FIG. 3.

After the segmentation, the ports on the UE side and the UPF side are integrated as part of the bridge by the 5GS bridge and notified to the TSN TT, and then provided to the CNC for registration or modification of the TSN bridge.

However, when bridge division is performed in the 5GS, a complete 5GS system may be segmented into multiple TSN virtual bridges, and there are no interconnection ports between these multiple virtual TSN bridges, thus resulting in a system in which communication would otherwise be possible between 5GSs, after being segmented into virtual TSN bridges, not being able to connect in the CNC's view instead. The routes within the 5GS could have been used to calculate paths and forward messages, however, the CNC is not aware of these routes, resulting in the inability to perform path calculation, which would result in a much lower success rate of path calculation.

Meanwhile, the transmission latency of the 5GS system is not fixed, and the latency is related to the resources allocated by the system, and its span is relatively large. In this case, the CNC cannot directly sum up the latencies acquired on the link as before as a basis for judgment when performing path calculations. Therefore, it's important to provide an effective solution for path calculation of the 5GS-TSN-VB link.

SUMMARY

A link path calculation method, device, and terminal device and a non-transitory computer-readable storage medium are provided by the embodiments of the present disclosure, which are applicable to a 5GS-TSN-VB link, in order to enhance success rate of path calculation and improve user experience, to at least a certain extent.

The embodiments of the present disclosure provide a link path calculation method applied to a 5GS-TSN-VB link, which may include: acquiring a topology containing a TSN bridge, the TSN bridge including a 5GS TSN virtual bridge and a common TSN bridge; acquiring a latency parameter of a link of the TSN bridge; acquiring a minimum latency Tmin, achievable by the 5GS-TSN-VB as a 5GS, where UE connected to a listener is located at the 5GS-TSN-VB, and acquiring a maximum latency MaxLatency in service requirements; calculating an optimal path and determining the sum Tc of all link latencies on the optimal path; determining, according to the Tc, Tmin, and MaxLatency, a maximum latency Tmax tolerated by the 5GS-TSN-VB; determining an optimal value Tmax–O of the Tmax according to the Tmax, the Tmax–O being less than or equal to the Tmax and the Tmax–O being greater than zero; and sending service flow information and the Tmax–O as latency requirements to a 5GS system corresponding to the 5GS-TSN-VB, and sending the service flow information to a corresponding TSN bridge in response to path calculation being successful.

Embodiments of the present disclosure also provide a link path calculation device, which may include: a first acquisition module configured to acquire a topology containing a TSN bridge, the TSN bridge including a 5GS TSN virtual bridge and a common TSN bridge; a second acquisition module configured to acquire a latency parameter of a link of the TSN bridge; a third acquisition module configured to acquire a minimum latency Tmin, achievable by the 5GS-TSN-VB as a 5GS where UE connected to a listener is located at the 5GS-TSN-VB, and acquire a maximum latency MaxLatency in service requirements; a first calculation module configured to calculate an optimal path and determine the sum Tc of all link latencies on the optimal path; a second calculation module configured to determine, according to the Tc, Tmin, and MaxLatency, a maximum latency Tmax tolerated by the 5GS-TSN-VB; a third calculation module configured to determine an optimal value Tmax–O of the Tmax according to the Tmax, the Tmax–O being less than or equal to the Tmax and the Tmax–O being greater than zero; and a sending module configured to send service flow information and the Tmax–O as latency requirements to a 5GS system corresponding to the 5GS-TSN-VB, and send the service flow information to a corresponding TSN bridge in response to path calculation being successful.

Embodiments of the present disclosure also provide a link path calculation terminal device applied to a 5GS-TSN-VB link, which may include: a processor, a memory and a communication bus, where the communication bus is configured to implement connection and communication between the processor and the memory; and the processor is configured to execute one or more computer programs stored in the memory to implement the link path calculation method as described in any one of the above.

Embodiments of the present disclosure also provide a non-transitory computer-readable storage medium storing one or more computer programs executable by one or more processors to implement the link path calculation method as described in any one of the above.

The beneficial effects of the present disclosure: the present disclosure provides a link path calculation method, device, and terminal device and a non-transitory computer-readable storage medium. With the link path calculation method, through acquiring a topology of a TSN bridge including a 5GS TSN virtual bridge and a common TSN bridge; acquiring a latency parameter of a link of the TSN bridge, and a minimum latency Tmin, achievable by the 5GS-TSN-VB as a 5GS where UE connected to a listener is located the 5GS-TSN-VB, and acquiring a maximum latency MaxLatency in service requirements; calculating an optimal path and determining the sum Tc of all link latencies on the optimal path; determining, according to the Tc, Tmin, and MaxLatency, a maximum latency Tmax tolerated by the 5GS-TSN-VB; determining an optimal value Tmax–O of the Tmax according to the Tmax, the Tmax–O being less than or equal to the Tmax and the Tmax–O being greater than zero; and sending service flow information and the Tmax–O as latency requirements to a 5GS system corresponding to the 5GS-TSN-VB, and sending the service flow information to a corresponding TSN bridge in response to path calculation being successful, an effective solution is provided for path calculation of a 5GS-TSN-VB link, which enhances the success rate of path calculation and improves user experience.

Other features and corresponding beneficial effects of the present disclosure are explained in the subsequent description, and it should be understood that at least some of the beneficial effects become apparent from the description of the present disclosure.

DETAILED DESCRIPTION

In order to make the objective, technical schemes and advantages of the present disclosure more clearly understood, the embodiments of the present disclosure will be illustrated in detail by means of several embodiments in conjunction with the accompanying drawings. It should be understood that the particular embodiments described herein are only intended to explain the present disclosure, and are not intended to limit the present disclosure.

Example Embodiment I

Figure 4:
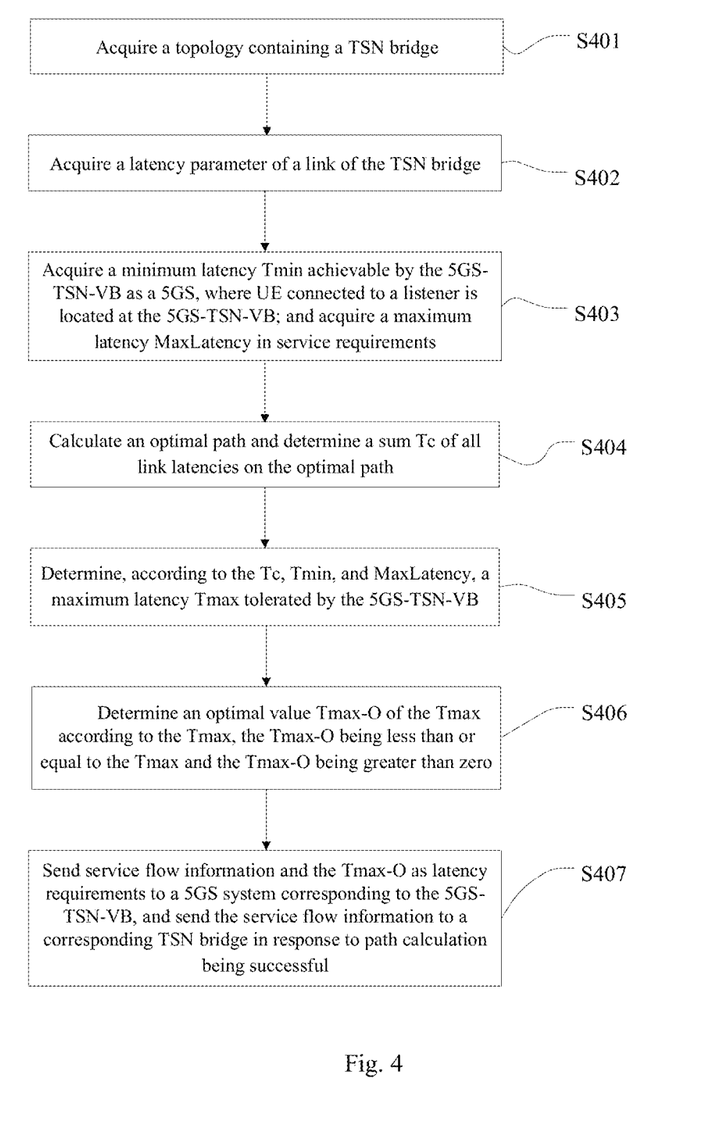
FIG. 4 is a flowchart of a link path calculation method provided in example embodiment I of the present disclosure.

Referring to FIG. 4, a link path calculation method provided in this embodiment includes steps S401 to S407.

At S401, a topology containing a TSN bridge is acquired.

At S402, a latency parameter of a link of the TSN bridge is acquired.

At S403, a minimum latency Tmin, achievable by the 5GS-TSN-VB as a 5GS where UE connected to a listener is located, and a maximum latency MaxLatency in service requirements, are acquired.

At S404, an optimal path is calculated and the sum Tc of all link latencies on the optimal path is determined.

At S405, a maximum latency Tmax tolerated by the 5GS-TSN-VB is determined according to the Tc, Tmin, and MaxLatency.

At S406, an optimal value Tmax–O of the Tmax is determined according to the Tmax, the Tmax–O being less than or equal to the Tmax and the Tmax–O being greater than zero.

At S407, service flow information and the Tmax–O are sent as latency requirements to a 5GS system corresponding to the 5GS-TSN-VB, and the service flow information is sent to a corresponding TSN bridge in response to path calculation being successful.

In some embodiments, the event processing method is applied to a 5GS-TSN-VB link, where the TSN bridge includes a 5GS TSN virtual bridge and a common TSN bridge.

In some embodiments, the topology containing a TSN bridge may be acquired by a TSN entity such as CNC, CUC, End-Station, etc., where the topology may be acquired in an existing implementable manner, which is not limited in the embodiments of the present disclosure.

It should be noted that the above-mentioned acquiring minimum latency Tmin, achievable by the 5GS-TSN-VB as a 5GS where UE connected to a receiver (listener) is located, and a maximum latency MaxLatency in service requirements, may be implemented using the relevant existing technology in the field, and is not limited here.

It should be noted that the calculation of the optimal path may be implemented using the relevant existing technology in the field, and is not limited here.

To determine the sum Tc of all link latencies on the optimal path, all link latencies on the optimal path may be accumulated, and the resulting sum is Tc.

It should be noted that the minimum latency Tmin, achievable by the 5GS-TSN-VB as a 5GS where UE connected to the listener is located, may be configured by the user or the system, and a minimum value of the minimum latency Tmin may be 0.

In some embodiments, in response to the presence of segmentation in the 5GS system, before acquiring a latency parameter of a link of the TSN bridge, the link path calculation method further includes: configuring a virtual fully connected 5GS-VL between segmented virtual TSN bridges; and acquiring a topology of the 5GS-VL; and the TSN bridge further includes the 5GS-VL.

It should be noted that in response to the presence of segmentation in the 5GS system, a virtual fully connected 5GS-VL may be configured between the segmented virtual TSN bridges, and then the topology of the TSN bridge including the virtual fully connected 5GS-VL may be acquired, where the TSN bridge includes a 5GS TSN virtual bridge, 5GS-VL and common TSN bridges. It should be noted that the common TSN bridge includes bridges in the TSN bridge other than the 5GS TSN virtual bridge and the 5GS-VL.

In some embodiments, the 5GS-VL may be a fully connected virtual connection 5GS-VL which is added between segmented TSN virtual bridges in the 5GS system, where each virtual connection has a determined internal latency that may be calculated and read through real internal routes, and these virtual connections may be utilized by TSN entities such as CNCs and used for path calculations.

In some embodiments, the method of segmentation includes, but is not limited to, the following two methods: UPF-based segmentation, and UE-based segmentation.

It should be noted that those having ordinary skills in the art may also use other existing methods to implement segmentation of a 5GS system, and after adding a fully connected virtual connection 5GS-VL between the segmented TSN virtual bridges, link management and path calculation may also be performed in the method provided in the embodiments of the present disclosure.

In some embodiments, determining, according to the Tc, Tmin, and MaxLatency, a maximum latency Tmax tolerated by the 5GS-TSN-VB includes: Tmax=MaxLatency−Tc+Tmin.

In some embodiments, determining an optimal value Tmax−O of the Tmax according the Tmax includes: determining a policy function f(x,y) according to latency (x), tariff and/or resource (y), the f(x,y) being less than or equal to 1; and Tmax−O=f(x,y)*Tmax.

It should be noted that the above-mentioned policy function f(x,y) determined based on latency (x), tariff and/or resources (y) may be a policy function developed by the user based on conditions related to latency, tariff and/or resources.

In some embodiments, Tmax−O is equal to Tmax multiplied by a predetermined coefficient, which is a value greater than 0 and less than or equal to 1. The predetermined coefficient may be obtained by the user through trial calculations based on the tariff, resource usage and latency that the user can afford, or it may be determined by the user by building a calculation model between the tariff, resource occupation and latency.

In some embodiments, determining an optimal value Tmax−O of the Tmax according the Tmax includes: the Tmax−O being equal to a smaller one of latencies of the 5GS system in response to the latencies of the 5GS system being at least two discrete points.

Figure 5:
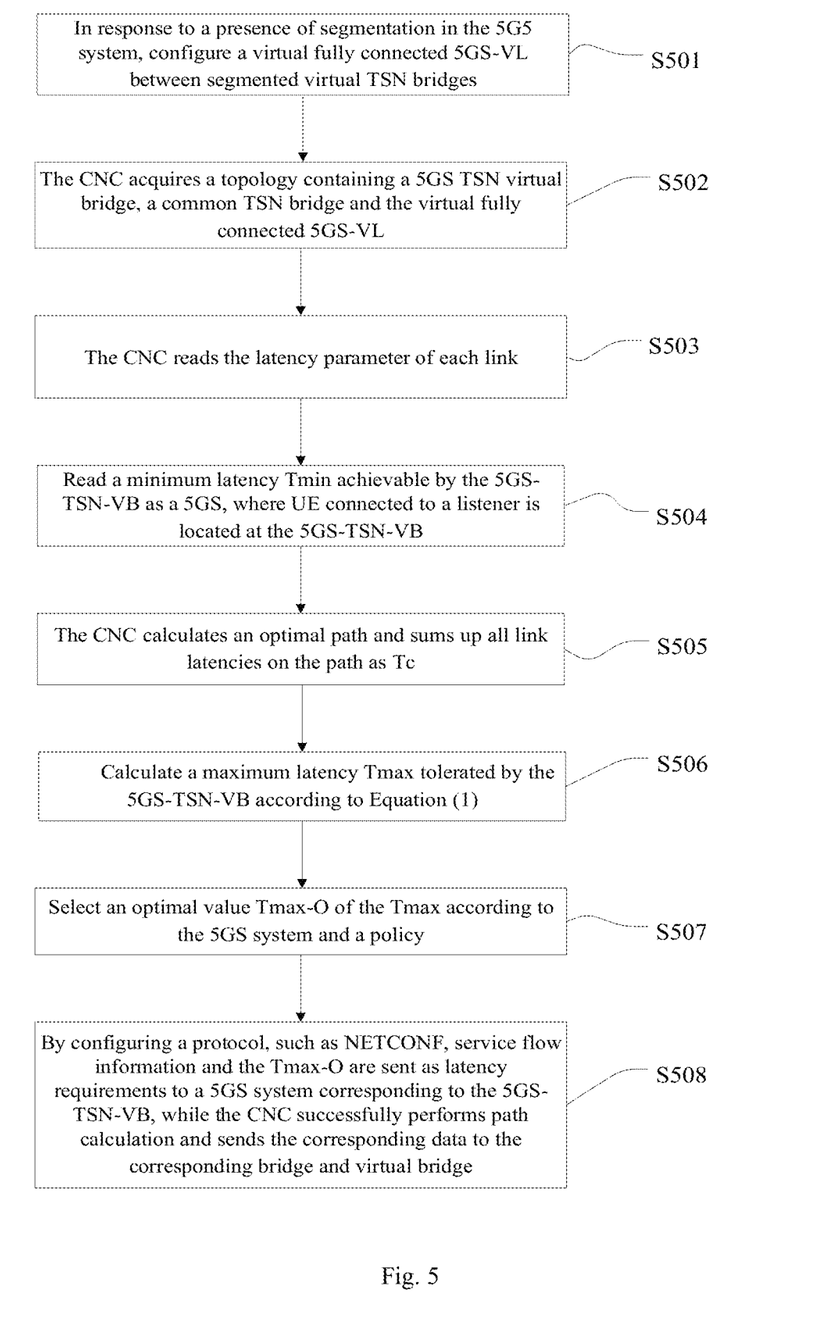
FIG. 5 is a flowchart of an implementation of a link path calculation method provided in example embodiment I of the present disclosure.

For ease of understanding, the above method is further described below by means of an embodiment. As shown in FIG. 5, the method includes the steps S501 to S508.

At S501, in response to the presence of segmentation in the 5GS system, a virtual fully connected 5GS-VL is configured between segmented virtual TSN bridges.

At S502, the CNC acquires a topology containing a 5GS TSN virtual bridge, a common TSN bridge and the virtual fully connected 5GS-VL.

At S503, the CNC reads the latency parameter of each link.

At S504, a minimum latency Tmin, achievable by the 5GS-TSN-VB as a 5GS where UE connected to the listener is located, is read.

At S505, the CNC calculates an optimal path and sums up all link latencies on the path as Tc.

At S506, a maximum latency Tmax tolerated by the 5GS-TSN-VB is calculated according to Equation (1).

At S507, an optimal value Tmax−O of the Tmax is selected according to the 5GS system and a policy.

At S508, by configuring a protocol, such as NETCONF, service flow information and the Tmax−O are sent as latency requirements to a 5GS system corresponding to the 5GS-TSN-VB, while the CNC successfully performs path calculation and sends the corresponding data to the corresponding bridge and virtual bridge.

It should be noted that the equation in S506 is shown as follows:

$$T\text{max}=\text{MaxLatency}-Tc+T\text{min} \qquad \text{Equation (1)}$$

The selection of the optimal value in S507 may be performed in the following two methods:

(1) An optimal value less than Tmax is selected according to a certain policy (taking into consideration the combination of latency and tariff/resources);

$$T\text{max}-O=f(x,y)*T\text{max} \qquad \text{Equation (2)}$$

where f(x,y) is a policy function of latency (x), tariff/resources (y), f(x,y)≤1.

(2) In response to the latencies of the radio system being discrete points $T[t_0, t_1, t_2, \ldots t_n]$, where $t_0<t_1<t_2 \ldots <t_n$, then a discrete latency value is selected for Tmax−O, and in response to $t_m \leq T\text{max}-O<t_{m+1}$ being satisfied, $$T\text{max}-O=t_m \qquad \text{Equation (3)}$$

It should be noted that the value of Tmin may be configured, and the minimum value of Tmin may be configured to 0. MaxLatency is the maximum latency in the service requirements In some embodiments, no segmentation is performed in the 5GS system, which exists only as a whole. In this case, during the selection and calculation of its latency, it is not necessary to consider adding a virtual fully connected 5GS-VL, and it is only necessary to calculate the 5GS TSN virtual bridge and the common TSN bridge.

Figure 6:
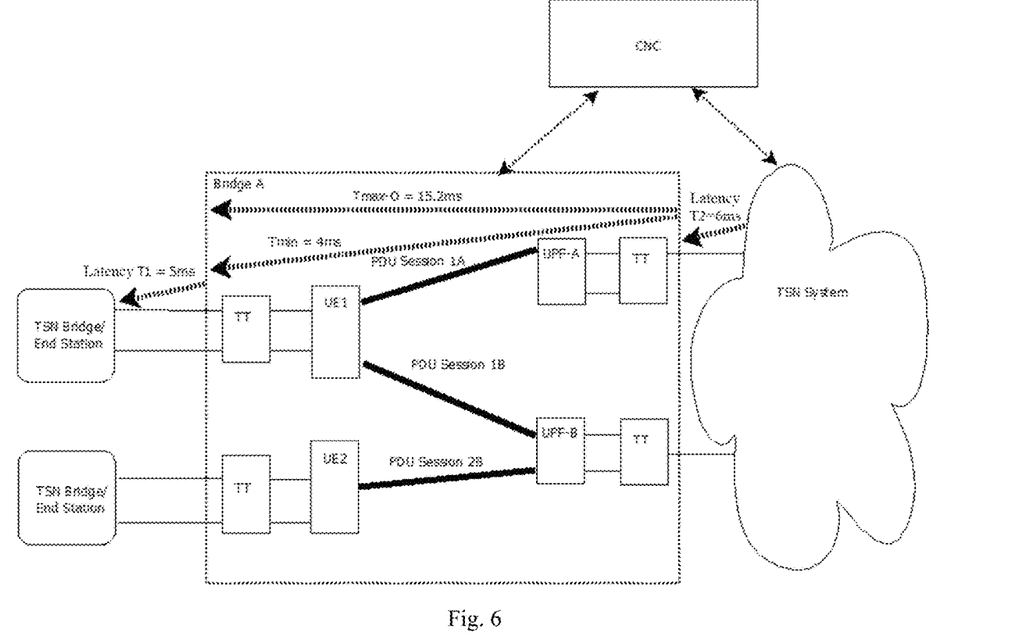
FIG. 6 is a schematic diagram of an implementation of another link path calculation method provided in example embodiment I of the present disclosure.

FIG. 6 illustrates an embodiment of the link path calculation method in the case where a 5GS system works as a whole without segmentation. As shown in FIG. 6, the 5GS system serves as a whole TSN virtual bridge, where the dashed arrows are the calculation paths for the CNC. Assuming that the link latency on the left side of the 5GS of the optimal path calculated in the figure is T1=5 ms, and on the right side the link latency is T2=6 ms, and in the service requirements, MaxLatency=26 ms, and Tmin=4 ms, then Tmax=MaxLatency−(T1+T2)+Tmin=19 ms is calculated according to Equation (1), and then the optimal value Tmax−O is calculated according to Equation (2). Assuming that the policy function f(x,y)=0.8, then Tmax−O=15.2 ms is calculated and is sent to the 5GS system corresponding to 5GS-TSN-VB via NETCONF, while the CNC successfully performs path calculation and sends the corresponding data to the corresponding common bridge and virtual bridge.

Figure 7:
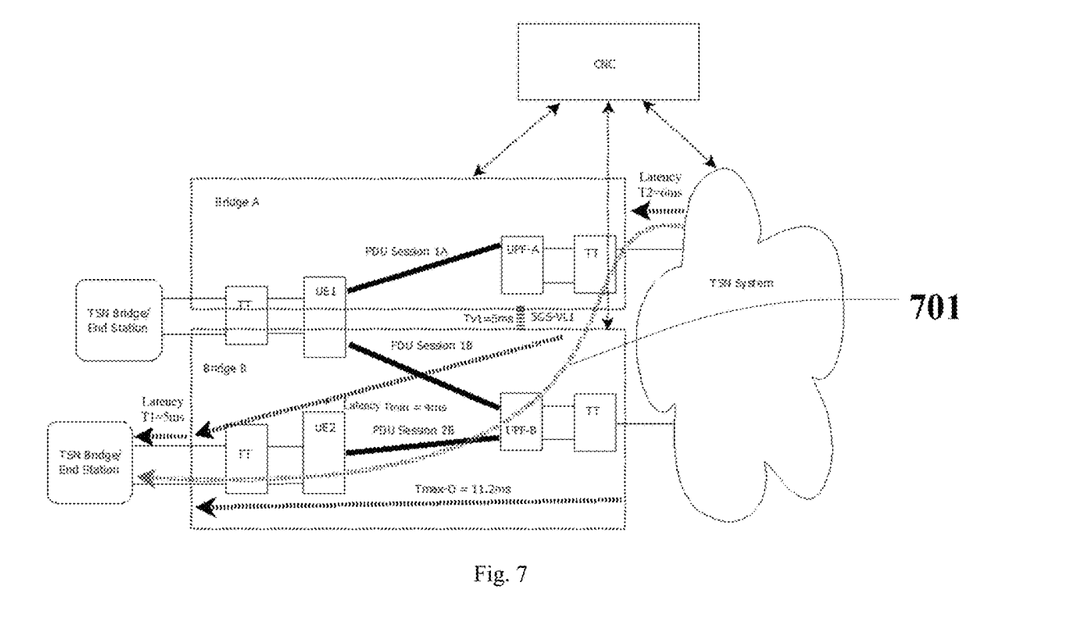
FIG. 7 is a schematic diagram of an implementation of another link path calculation method provided in example embodiment I of the present disclosure.

FIG. 7 illustrates an embodiment of the link path calculation method in the case where UPF-based segmentation is performed in the 5GS system. As shown in FIG. 7, there is a virtual connection 5GS-VL 1 configured between Bridge A and Bridge B, where the latency of this link may be acquired by the CNC, and messages may be forwarded between UPF-A and UPF-B. The path 701 calculated by the CNC contains a virtual link inside the 5GS system, from Bridge A to Bridge B. Assuming that the link latency on the left side of the 5GS of the optimal path calculated in the figure is T1=5 ms, and on the right side the link latency is T2=6 ms, and in the service requirements, MaxLatency=26 ms, Tmin=4 ms, and the latency of 5GS-VL 1 is Tv1=5 ms, then Tmax=MaxLatency−(T1+T2+Tv1)+Tmin=14 ms is calculated according to Equation (1), and then the optimal value Tmax−O is calculated according to Equation (2). Assuming that the policy function f(x,y)=0.8, then Tmax−O=11.2 ms is calculated. At this time, Tmax−O=11.2 ms is sent as the latency requirement to the 5GS system corresponding to 5GS-TSN-VB via NETCONF, while the CNC successfully performs path calculation and sends the corresponding data to the corresponding common bridge and virtual bridge.

Figure 8:
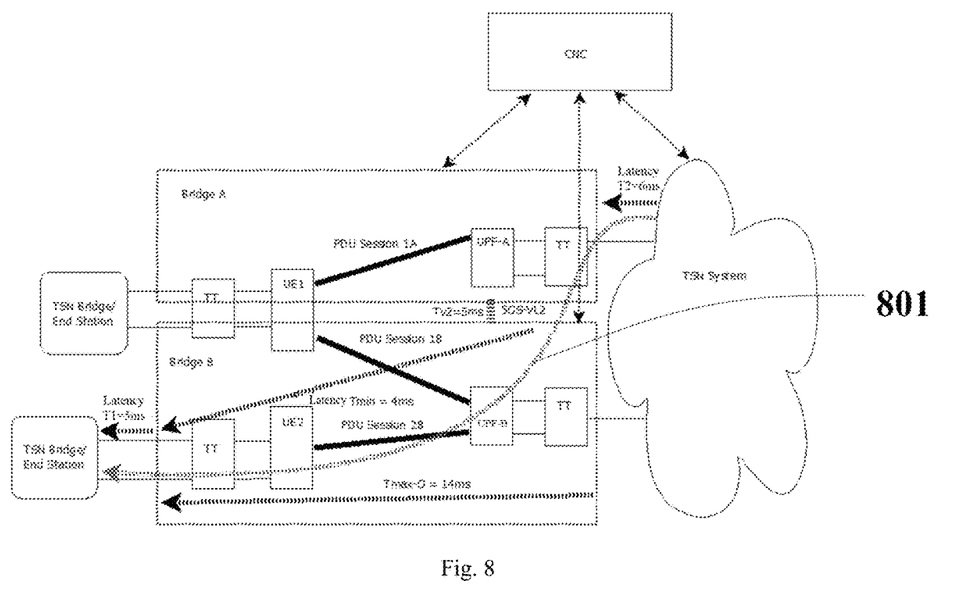
FIG. 8 is a schematic diagram of an implementation of another link path calculation method provided in example embodiment I of the present disclosure.

FIG. 8 illustrates an embodiment of the link path calculation method in the case where UPF-based segmentation is performed in the 5GS system. As shown in FIG. 8, there is a virtual connection 5GS-VL2 configured between Bridge A and Bridge B, where the latency of this link may be acquired by the CNC, and messages may be forwarded between UPF-A and UPF-B. The path 80 calculated by the CNC contains a virtual link inside the 5GS system, from Bridge A to Bridge B. Assuming that the link latency on the left side of the 5GS of the optimal path≤14 ms<16 ms, Tmax−O=14 ms. At this time, Tmax−O=14 ms is sent as the latency requirement to the 5GS system corresponding to 5GS-TSN-VB via NETCONF, while the CNC successfully performs path calculation and sends the corresponding data to the corresponding common bridge and virtual bridge.

It should be noted that the UE-based segmentation calculation method is similar to that in the above embodiments and will not be repeated here.

With the link path calculation method proposed in the embodiment of the present disclosure, through acquiring a topology of a TSN bridge including a 5GS TSN virtual bridge and a common TSN bridge; acquiring a latency parameter of a link of the TSN bridge, and a minimum latency Tmin, achievable by the 5GS-TSN-VB as a 5GS where UE connected to a listener is located, and a maximum latency MaxLatency in service requirements; calculating an optimal path and determining the sum Tc of all link latencies on the optimal path; determining, according to the Tc, Tmin, and MaxLatency, a maximum latency Tmax tolerated by the 5GS-TSN-VB; determining an optimal value Tmax−O of the Tmax according to the Tmax, the Tmax−O being less than or equal to the Tmax and the Tmax−O being greater than zero; and sending service flow information and the Tmax−O as latency requirements to a 5GS system corresponding to the 5GS-TSN-VB, and sending the service flow information to a corresponding TSN bridge in response to path calculation being successful, the internal paths of the 5GS system are effectively utilized, which greatly increases the success rate of path calculation and effectively balances the contradiction between tariff/resources and latency, and improves the user experience.

In response to the presence of segmentation in the 5GS system, a fully connected virtual connection 5GS-VL is added between the segmented TSN virtual bridge, where the introduction of the 5GS-VL enables virtual link connections between the segmented virtual TSN bridges. At the same time, a backward path calculation method is proposed based on the virtual connections, which can configure the optimal time requirement and resource occupation for virtual links within the 5GS TSN virtual bridge.

Example Embodiment II

Figure 9:
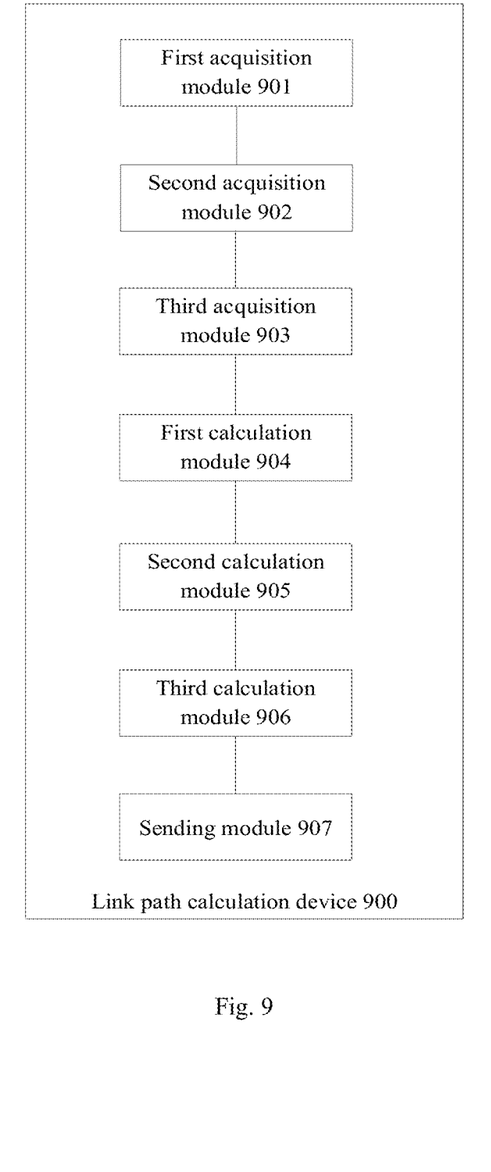
FIG. 9 a schematic diagram of a link path calculation device provided in example embodiment II of the present disclosure.

This embodiment provides a link path calculation device. As shown in FIG. 9, the link path calculation device 900 includes a first acquisition module 901, a second acquisition module 902, a third acquisition module 903, a first calculation module 904, a second calculation module 905, a third calculation module 906 and a sending module 907.

The first acquisition module 901 is configured to acquire a topology containing a TSN bridge, the TSN bridge including a 5GS TSN virtual bridge and a common TSN bridge;

The second acquisition module 902 is configured to acquire a latency parameter of a link of the TSN bridge;

The third acquisition module 903 is configured to acquire a minimum latency Tmin, achievable by the 5GS-TSN-VB as a 5GS where UE connected to a listener is located, and a maximum latency MaxLatency in service requirements;

The first calculation module 904 is configured to calculate an optimal path and determine the sum Tc of all link latencies on the optimal path;

The second calculation module 905 is configured to determine, according to the Tc, Tmin, and MaxLatency, a maximum latency Tmax tolerated by the 5GS-TSN-VB;

The third calculation module 906 is configured to determine an optimal value Tmax−O of the Tmax according to the Tmax, the Tmax−O being less than or equal to the Tmax and the Tmax−O being greater than zero; and The sending module 907 is configured to send service flow information and the Tmax−O as latency requirements to a 5GS system corresponding to the 5GS-TSN-VB, and send the service flow information to a corresponding TSN bridge in response to path calculation being successful.

In some embodiments, the event processing method is applied to a 5GS-TSN-VB link, where the TSN network bridge includes a 5GS TSN virtual bridge and a common TSN bridge.

In some embodiments, the topology containing a TSN bridge may be acquired by a TSN entity such as CNC, CUC, End-Station, etc., where the topology may be acquired in an existing implementable manner, which is not limited in the embodiments of the present disclosure.

It should be noted that acquiring the minimum latency Tmin, achievable by the 5GS-TSN-VB as a 5GS where UE connected to a receiver (listener) is located, and a maximum latency MaxLatency in service requirements, may be implemented by utilizing the relevant existing technology in the field, and is not limited here.

It should be noted that the calculation of the optimal path may be implemented using the relevant existing technology in the field, and is not limited here.

The method to determine the sum Tc of all link latencies on the optimal path may be understood as adding up all link latencies on the optimal path, and the resulting sum is Tc.

It should be noted that the minimum latency Tmin, achievable by the 5GS-TSN-VB as a 5GS where UE connected to the listener is located, may be configured by the user or the system, and the minimum value of the minimum latency Tmin may be 0.

In some embodiments, in response to the presence of segmentation in the 5GS system, before acquiring a latency parameter of a link of the TSN bridge, the link path calculation device further includes a configuration module and a fourth acquisition module.

The configuration module is configured to configure, before the second acquisition module acquires a latency parameter of a link of the TSN bridge, a virtual fully connected 5GS-VL between segmented virtual TSN bridges; and The fourth acquisition module is configured to acquire a topology of the 5GS-VL.

In the configuration in which the second acquisition module acquires the latency parameter of the link of the TSN bridge, the TSN bridge further includes the 5GS-VL.

It should be noted that in response to the presence of segmentation in the 5GS system, a virtual fully connected 5GS-VL may be configured between the segmented virtual TSN bridges, and then the topology of the TSN bridge including the virtual fully connected 5GS-VL may be acquired, where the TSN bridge includes a 5GS TSN virtual bridge, 5GS-VL and common TSN bridges. It should be noted that the common TSN bridge includes bridges in the TSN bridge other than the 5GS TSN virtual bridge and the 5GS-VL.

In some embodiments, the 5GS-VL may be a fully connected virtual connection 5GS-VL added between segmented TSN virtual bridges in the 5GS system, where each virtual connection has a determined latency that may be calculated and read through real internal routes, and these virtual connections may be utilized by the CNC and used for path calculations.

In some embodiments, the method of segmentation includes, but is not limited to, the following two methods: UPF-based segmentation, and UE-based segmentation.

It should be noted that those having ordinary skills in the art may also use other existing methods to implement segmentation of a 5GS system, and after adding a fully connected virtual connection 5GS-VL between the segmented TSN virtual bridges, link management and path calculation may also be performed in the method provided in the embodiments of the present disclosure.

In some embodiments, the second calculation module determining, according to the Tc, Tmin, and MaxLatency, a maximum latency Tmax tolerated by the 5GS-TSN-VB includes: Tmax=MaxLatency−Tc+Tmin.

In some embodiments, the third calculation module determining an optimal value Tmax−O of the Tmax according to the Tmax includes: determining a policy function f(x,y) according to latency (x), tariff and/or resource (y), the f(x,y) being less than or equal to 1; and Tmax−O=f(x,y)*Tmax.

It should be noted that the above-mentioned policy function f(x,y) determined based on latency (x), tariff and/or resources (y) may be a policy function developed by the user based on conditions related to latency, tariff and/or resources.

In some embodiments, Tmax−O is equal to Tmax multiplied by a predetermined coefficient, which is a value greater than 0 and less than or equal to 1. The predetermined coefficient may be obtained by the user through trial calculations based on the tariff, resource usage and latency that the user can afford, or it may be determined by the user by building a calculation model between the tariff, resource occupation and latency.

In some embodiments, the third calculation module determining an optimal value Tmax−O of the Tmax according to the Tmax includes: the Tmax−O being equal to a smaller one of latencies of the 5GS system in response to the latencies of the 5GS system being at least two discrete points.

With the link path calculation device proposed in the embodiment of the present disclosure, through acquiring, by a first acquisition module, a topology of a TSN bridge including a 5GS TSN virtual bridge and a common TSN bridge; acquiring, by a second acquisition module, a latency parameter of a link of the TSN bridge, and acquiring, by a third acquisition module, a minimum latency Tmin, achievable by the 5GS-TSN-VB as a 5GS where UE connected to a listener is located, and a maximum latency MaxLatency in service requirements; calculating, by a first calculation module, an optimal path and determining the sum Tc of all link latencies on the optimal path; determining, by a second calculation module according to the Tc, Tmin, and MaxLatency, a maximum latency Tmax tolerated by the 5GS-TSN-VB; determining, by a third calculation module, an optimal value Tmax−O of the Tmax according to the Tmax, the Tmax−O being less than or equal to the Tmax and the Tmax−O being greater than zero; and sending, by a sending module, service flow information and the Tmax−O as latency requirements to a 5GS system corresponding to the 5GS-TSN-VB, and sends the service flow information to a corresponding TSN bridge in response to path calculation being successful, the internal paths of the 5GS system are effectively utilized, which greatly increases the success rate of path calculation and effectively balances the contradiction between tariff/resources and latency, and improves the user experience.

In response to the presence of segmentation in the 5GS system, a fully connected virtual connection 5GS-VL is added between the segmented TSN virtual bridge, where the introduction of the 5GS-VL enables virtual link connections between the segmented virtual TSN bridges. At the same time, a backward path calculation method is proposed based on the virtual connections, which can configure the optimal time requirement and resource occupation for virtual links within the 5GS TSN virtual bridge.

Example Embodiment III

Figure 10:
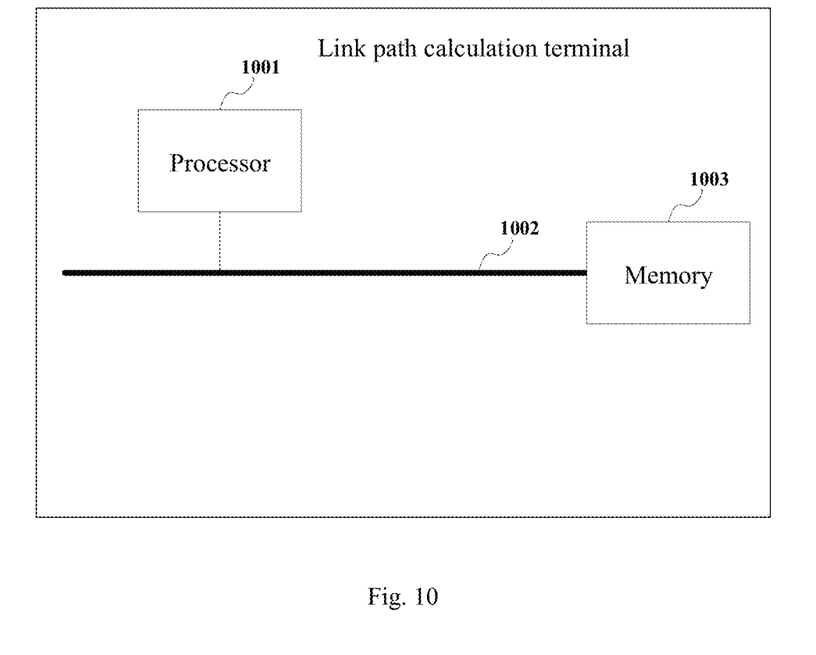
FIG. 10 is a schematic diagram of a link path calculation terminal device provided in example embodiment III of the present disclosure.

This embodiment provides a link path calculation terminal device which, as shown in FIG. 10, includes a processor 1001, a memory 1003, and a communication bus 1002, where: the communication bus 1002 is configured to implement connection and communication between the processor 1001 and the memory 1003; and the processor 1001 is configured to execute one or more computer programs stored in memory 1003 to implement at least one step of the link path calculation method as described in the above embodiments.

Example Embodiment IV

This embodiment provides a computer-readable storage medium that includes a volatile or non-volatile, removable or non-removable medium implemented in any method or technology for storing information, such as computer-readable instructions, data structures, computer program modules, or other data. The computer-readable storage medium includes, but is not limited to, random access memory (RAM), read-only memory (ROM), electrically erasable programmable read-only memory (EEPROM), flash memory or other memory technologies, compact disc read-only memory (CD-ROM), digital versatile disc (DVD) or other optical disc storage, cassettes, magnetic tapes, magnetic disc storage or other magnetic storage devices, or any other media that can be configured to store desired information and can be accessed by computers.

The computer-readable storage medium in this embodiment may be used to store one or more computer programs executable by a processor to implement at least one step of the link path calculation method as described in the above embodiments.

This embodiment also provides a computer program (or computer software) which may be distributed on a computer-readable medium and may be executed by a computing device to implement at least one step of the event processing method as described in the above embodiments; and in some cases, at least one step illustrated or described may be performed in an order different from that described in the above embodiments.

It should be understood that in some cases, at least one step illustrated or described may be performed in an order different from that described in the above embodiments.

This embodiment also provides a computer program product including a computer-readable device on which a computer program as illustrated above is stored. In this embodiment, the computer-readable device may include the computer-readable storage medium as illustrated above.

As can be seen, it should be understood by those having ordinary skills in the art that all or some of the steps in the methods disclosed above, functional modules/units in the systems and devices disclosed above may be implemented as software (which may be implemented by computer program code executable by a computing device), firmware, hardware, and appropriate combinations thereof. In the hardware implementation, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processing unit, a digital signal processor or a microprocessor, or as hardware, or as an integrated circuit, such as an application specific integrated circuit.

Furthermore, it is well known to those having ordinary skills in the art that communication media typically contain computer-readable instructions, data structures, computer program modules or other data in a modulated data signal such as a carrier wave or other transmission mechanism, and may include any information delivery media. Therefore, the present disclosure is not limited to any particular combination of hardware and software.

The foregoing is a detailed description of several embodiments of the present disclosure in conjunction with particular implementations, and implementations of the present disclosure should not be construed as being limited to the description. For those having ordinary skills in the art to which the present disclosure pertains, without departing from the principles of the present disclosure, several simple deductions or substitutions can be made, which should be regarded as falling within the scope of the present disclosure.

INDUSTRIAL APPLICABILITY

Based on the link path calculation method provided in the above embodiments of the present disclosure, through acquiring a topology of a TSN bridge including a 5GS TSN virtual bridge and a common TSN bridge; acquiring a latency parameter of a link of the TSN bridge, and a minimum latency Tmin that the 5GS-TSN-VB where UE connected to a listener is located can achieve as a 5GS and a maximum latency MaxLatency in service requirements; calculating an optimal path and determining the sum Tc of all link latencies on the optimal path; determining, according to the Tc, Tmin, and MaxLatency, a maximum latency Tmax tolerated by the 5GS-TSN-VB; determining an optimal value Tmax–O of the Tmax according to the Tmax, the Tmax–O being less than or equal to the Tmax and the Tmax–O being greater than zero; and sending service flow information and the Tmax–O as latency requirements to a 5GS system corresponding to the 5GS-TSN-VB, and sending the service flow information to a corresponding TSN bridge in response to path calculation being successful, an effective solution is provided for path calculation of a 5GS-TSN-VB link, which enhances the success rate of path calculation.

The invention claimed is:

1. A link path calculation method applied to a 5G System Architecture-Time Sensitive Network-Virtual Bridge (5GS-TSN-VB) link, comprising:
   acquiring a topology containing a Time Sensitive Network (TSN) bridge, the TSN bridge comprising a 5G System Architecture (5GS) TSN virtual bridge and a common TSN bridge;
   acquiring a latency parameter of a link of the TSN bridge;
   acquiring a minimum latency Tmin achievable by the 5GS-TSN-VB as a 5GS, wherein User Equipment (UE) connected to a listener is located at the 5GS-TSN-VB; and
   acquiring a maximum latency MaxLatency in service requirements;
   calculating an optimal path and determining a sum Tc of all link latencies on the optimal path;
   determining, according to the Tc, Tmin, and MaxLatency, a maximum latency Tmax tolerated by the 5GS-TSN-VB;
   determining an optimal value Tmax–O of the Tmax according to the Tmax, the Tmax–O being less than or equal to the Tmax and the Tmax–O being greater than zero; and
   sending service flow information and the Tmax–O as latency requirements to a 5GS system corresponding to the 5GS-TSN-VB, and sending the service flow information to a corresponding TSN bridge in response to path calculation being successful.

2. The link path calculation method of claim 1, in response to a presence of segmentation in the 5GS system, before acquiring a latency parameter of a link of the TSN bridge, further comprising:
   configuring a virtual fully connected 5G System Architecture-Virtual Link (5GS-VL) between segmented virtual TSN bridges; and
   acquiring a topology of the 5GS-VL;
   wherein the TSN bridge further comprises the 5GS-VL.

3. The link path calculation method of claim 2, wherein the segmentation comprises at least one of: User Plane Function (UPF)-based segmentation, or UE-based segmentation.

4. The link path calculation method of claim 3, wherein determining, according to the Tc, Tmin, and MaxLatency, a maximum latency Tmax tolerated by the 5GS-TSN-VB comprises:

$T\max=\text{MaxLatency}-Tc+T\min.$

5. The link path calculation method of claim 2, wherein determining, according to the Tc, Tmin, and MaxLatency, a maximum latency Tmax tolerated by the 5GS-TSN-VB comprises:

$T\max=\text{MaxLatency}-Tc+T\min.$

6. The link path calculation method of claim 1, wherein determining, according to the Tc, Tmin, and MaxLatency, a maximum latency Tmax tolerated by the 5GS-TSN-VB comprises:

$T\max=\text{MaxLatency}-Tc+T\min.$

7. The link path calculation method of claim 6, wherein determining an optimal value Tmax–O of the Tmax according to the Tmax comprises:
determining a policy function f(x,y) according to latency (x), tariff and resource (y), the f(x,y) being less than or equal to 1; and $T\max-O=f(x,y)*T\max.$ 8. The link path calculation method of claim 6, wherein determining an optimal value Tmax–O of the Tmax according to the Tmax comprises:
the Tmax–O being equal to a smaller one of latencies of the 5GS system in response to the latencies of the 5GS system being at least two discrete points.

9. The link path calculation method of claim 6, wherein determining an optimal value Tmax–O of the Tmax according to the Tmax comprises:
determining a policy function f(x,y) according to latency (x), tariff or resource (y), the f(x,y) being less than or equal to 1; and $T\max-O=f(x,y)*T\max.$ 10. A non-transitory computer-readable storage medium storing one or more computer programs executable by one or more processors to implement the link path calculation method of claim 1.

11. A link path calculation device, comprising:
a first acquisition circuit configured to acquire a topology containing a Time Sensitive Network (TSN) bridge, the TSN bridge comprising a 5G System Architecture (5GS) TSN virtual bridge and a common TSN bridge;
a second acquisition circuit configured to acquire a latency parameter of a link of the TSN bridge;
a third acquisition circuit configured to acquire a minimum latency Tmin achievable by the 5G System Architecture-Time Sensitive Network-Virtual Bridge (5GS-TSN-VB) as a 5GS, wherein User Equipment (UE) connected to a listener is located at the 5GS-TSN-VB, and a maximum latency MaxLatency in service requirements;
a first calculation circuit configured to calculate an optimal path and determine a sum Tc of all link latencies on the optimal path;
a second calculation circuit configured to determine, according to the Tc, Tmin, and MaxLatency, a maximum latency Tmax tolerated by the 5GS-TSN-VB;
a third calculation circuit configured to determine an optimal value Tmax–O of the Tmax according to the Tmax, the Tmax–O being less than or equal to the Tmax and the Tmax–O being greater than zero; and
a sending circuit configured to send service flow information and the Tmax–O as latency requirements to a 5GS system corresponding to the 5GS-TSN-VB, and send the service flow information to a corresponding TSN bridge in response to path calculation being successful.

12. The link path calculation device of claim 11, in response to a presence of segmentation in the 5GS system, further comprising:
a configuration circuit configured to configure, before the second acquisition circuit acquires a latency parameter of a link of the TSN bridge, a virtual fully connected 5G System Architecture-Virtual Link (5GS-VL) between segmented virtual TSN bridges; and
a fourth acquisition circuit configured to acquire a topology of the 5GS-VL;
wherein in the configuration in which the second acquisition circuit acquires the latency parameter of the link of the TSN bridge, the TSN bridge further comprises the 5GS-VL.

13. The link path calculation device of claim 12, wherein the segmentation comprises at least one of: User Plane Function (UPF)-based segmentation, or UE-based segmentation.

14. The link path calculation device of claim 11, wherein the second calculation circuit is configured to:
determine, according to the Tc, Tmin, and MaxLatency, a maximum latency Tmax tolerated by the 5GS-TSN-VB, by adopting $T\max=\text{MaxLatency}-Tc+T\min.$ 15. The link path calculation device of claim 14, wherein the third calculation circuit is configured to:
determine an optimal value Tmax–O of the Tmax according to the Tmax, by adopting Tmax–O=f(x,y)*Tmax, where f(x,y) is a policy function f(x,y) determined according to latency (x), tariff and resource (y), and f(x,y) is less than or equal to 1.

16. The link path calculation device of claim 14, wherein the third calculation circuit is configured to:
determine an optimal value Tmax–O of the Tmax according to the Tmax, wherein the Tmax–O is equal to a smaller one of latencies of the 5GS system in response to the latencies of the 5GS system being at least two discrete points.

17. The link path calculation device of claim 14, wherein the third calculation circuit is configured to:
determine an optimal value Tmax–O of the Tmax according to the Tmax, by adopting Tmax–O=f(x,y)*Tmax, where f(x,y) is a policy function f(x,y) determined according to latency (x), tariff and resource (y), and f(x,y) is less than or equal to 1.

18. A link path calculation terminal device applied to a 5G System Architecture-Time Sensitive Network-Virtual Bridge (5GS-TSN-VB) link, comprising:
a memory storing one or more computer programs;
a processor configured to execute the one or more computer programs to implement a link path calculation method applied to the 5GS-TSN-VB link, comprising:
acquiring a topology containing a Time Sensitive Network (TSN) bridge, the TSN bridge comprising a 5G System Architecture (5GS) TSN virtual bridge and a common TSN bridge;
acquiring a latency parameter of a link of the TSN bridge;
acquiring a minimum latency Tmin achievable by the 5GS-TSN-VB as a 5GS, wherein User Equipment (UE) connected to a listener is located at the 5GS-TSN-VB; and acquiring a maximum latency MaxLatency in service requirements;

calculating an optimal path and determining a sum Tc of all link latencies on the optimal path;

determining, according to the Tc, Tmin, and MaxLatency, a maximum latency Tmax tolerated by the 5GS-TSN-VB;

determining an optimal value Tmax–O of the Tmax according to the Tmax, the Tmax–O being less than or equal to the Tmax and the Tmax–O being greater than zero; and sending service flow information and the Tmax–O as latency requirements to a 5GS system corresponding to the 5GS-TSN-VB, and sending the service flow information to a corresponding TSN bridge in response to path calculation being successful; and a communication bus configured to implement connection and communication between the processor and the memory.

\* \* \* \* \*